United States Patent

Urban et al.

[11] Patent Number: 5,982,867
[45] Date of Patent: Nov. 9, 1999

[54] METHOD AND SYSTEM FOR PROVIDING THE NAME OF THE STATE OF A CALLING PARTY

[75] Inventors: Ron Urban, Woodridge; Jim Kovarik, Batavia; Nancy Book, Naperville, all of Ill.

[73] Assignee: Ameritech Corporation, Hoffman Estates, Ill.

[21] Appl. No.: 08/756,598

[22] Filed: Nov. 27, 1996

[51] Int. Cl.[6] .............................. H04M 3/42; H04M 1/57; H04M 15/06; H04M 7/00
[52] U.S. Cl. .......................... 379/207; 279/142; 279/220; 279/230
[58] Field of Search ...................................... 379/127, 142, 379/223, 227, 228, 230, 245, 246, 247, 260, 267, 201, 207, 220, 221

[56] References Cited

U.S. PATENT DOCUMENTS

| | | | |
|---|---|---|---|
| 5,210,789 | 5/1993 | Jeffus et al. | 379/127 |
| 5,425,090 | 6/1995 | Orriss | 379/201 |
| 5,430,719 | 7/1995 | Weisser, Jr. | 370/389 |
| 5,438,568 | 8/1995 | Weisser, Jr. | 370/389 |
| 5,479,495 | 12/1995 | Blumhardt | 379/207 |
| 5,499,290 | 3/1996 | Koster | 379/242 |
| 5,517,562 | 5/1996 | McConnell | 379/207 |
| 5,519,772 | 5/1996 | Akman et al. | 379/265 |
| 5,526,413 | 6/1996 | Cheston, III et al. | 379/201 |
| 5,566,235 | 10/1996 | Hetz | 379/201 |
| 5,572,583 | 11/1996 | Wheeler, Jr. et al. | 379/207 |
| 5,754,636 | 5/1998 | Bayless et al. | 379/142 |

*Primary Examiner*—Harry S. Hong
*Attorney, Agent, or Firm*—Brinks Hofer Gilson & Lione

[57] ABSTRACT

A method for providing the names of the city and state of a calling party to a called party when the calling party's name is unavailable. The method utilizes the calling party's telephone number to determine the names of the city and state from which the calling party is calling. The method incorporates a database that contains combinations of telephone numbers and the names of the cities and states that correspond to the various combinations of numbers. In response to an indication that the name of the calling party is unavailable, the method accesses the databases and searches for the matching telephone number and corresponding city and state names. If the names are found, they are delivered to the calling party.

16 Claims, 4 Drawing Sheets

METHOD AND SYSTEM FOR PROVIDING THE NAME OF THE STATE OF A CALLING PARTY

This invention relates generally to telephone services and more specifically to enhanced caller identification services.

BACKGROUND OF THE INVENTION

Local telephone service providers offer a variety of optional services to their customers. The services can be broadly categorized as originating services and terminating services. Originating services are controlled by the originating or calling party's central office when the calling party places a call. In comparison, terminating services are controlled by the terminating or called party's central office when an attempt to terminate a call occurs.

One example of a terminating service is "caller identification." Caller identification provides the called party with the name and telephone number of the calling party. Caller identification is typically provided to a subscriber by its local central office. In particular, each central office ordinarily has access to a local database containing telephone numbers and the corresponding names of people within its local area. Prior to terminating a call to the called party, the central office searches its database for the telephone number of the calling party. If the telephone number is found within the database, the name corresponding to that number will be accessed and delivered to the called party by the central office.

If the telephone number and name are not within the database, the service cannot provide a name to the called party. When a service cannot identify a name corresponding to the number, it typically delivers a message indicating that the calling party's name is unavailable. Accordingly, a local database containing only a small quantity of numbers and corresponding names will generate a large number of "unavailable" messages.

An indication of unavailability provides the customer with no information about who is calling or where the call originated from. This is an undesirable result for a customer who is paying for a service that is designed to provide them with information about the person who is calling them.

The present embodiment of the invention address the problem of providing no information about the calling party when the called party's local database does not contain information about the calling party. When the called party's local database does not contain the calling party information alternative information regarding the calling party may be provided. In one embodiment, for example, the name of the state of the calling party is provided when the name of the calling party is unavailable. In another embodiment, the names of both the city and state of the calling party is provided when the name of the calling party is unavailable

DESCRIPTION OF THE PRESENTLY PREFERRED EMBODIMENT

Figure 1:
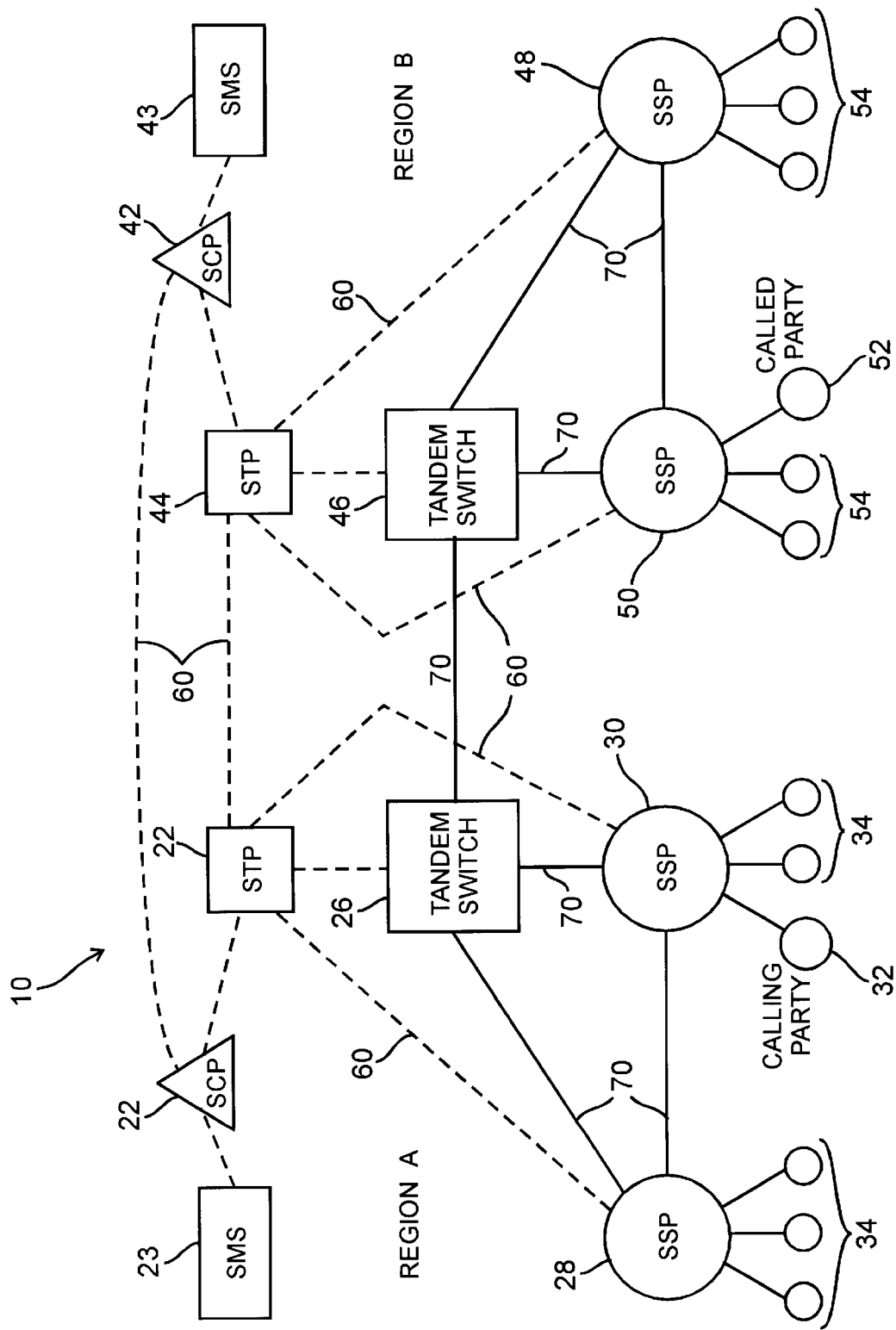
FIG. 1 is a block diagram of an advanced intelligent network telephone system.

FIG. 1 shows a modern telephone network 10. Such a telephone network may have network elements including signal switching points (SSP) 28, 30, 48, 50, signal transfer points (STP) 24, 44, tandem switches 26, 46 and service control points (SCP) 22, 42. These elements typically transfer network signaling protocols 60 and voice and data traffic 70 between one another.

For example, SSPs 28, 30, 48, 50 and tandem switches 26, 46 typically transfer voice and data traffic 70. SSPs 28, 30, 48, 50 also communicate with STPs 24, 44 to transfer network signaling protocols 60, such as those defined by Signaling System 7, which is well known in the art, to control the network switching of voice and data traffic.

Preferably, subscribers 34, 54 gain access to the network through the SSPs 28, 30, 48, 50. A SSP is similar to a local telephone central office equipped with a voice switch such as an AT&T #5 ESS or a Nortel DMS-100, well known to those skilled in the art. Central offices equipped with software implementing advanced intelligent network (AIN) features are designated as SSPs. AIN software enables a SSP to trigger a general query to be sent to an SCP. In response to a general query, the SCP determines what type of response is required.

As shown in FIG. 1, the telephone network may be divided into regions, such as region A and region B. Each region may include several central offices or SSPs. For example, SSPs 28, 30 within region A send and receive network signaling protocols 60 to and from STP 24 which services region A. SSPs 28, 30 within region A send voice and data traffic 70 to and from tandem switch 26 located within region A, as well as other SSPs 44 in region A.

Tandem switches 26, 46, STPs 24, 44 and SCPs 22, 42 typically provide voice and data traffic 70 and network signaling protocols 60 between customers in different geographic areas. For example, tandem switches 26, 46 transfer voice and data traffic 70 between regions. Tandem switches such as AIT No. 4 ESS and Northern Telecom DMS 100 are well known in the art. In addition to the tandem connection, it should be understood that SSPs in different areas may also transfer voice and data traffic directly between each other.

STPs 24, 44 communicate with SCPs 22, 42 to transfer network signaling protocols 60 STPs 24, 44 also transfer network signaling protocols 60 between regions. SCPs 22, 42 may also transfer network signaling protocols between region A and region B via STPs 24, 44. A STP and a SCP preferably include a microprocessor controlled computer system using computer peripherals controlled by application software programmed to implement the appropriate communication functions. STPs and SCPs are available from a number of telephone switch venders such as AT&T (Lucent Technologies), Nortel, and Siemens, for example.

Referring again to FIG. 1, the process of identifying the name of a calling party 32 in the preferred embodiment begins when the calling party 32 lifts the telephone receiver and sends the number of the called party 52 to the SSP 28. The SSP 28 of calling party 32 sends a network signaling protocol 60 to STP 24 which routes the network signaling protocol signal 60 to the SSP 50 of the called party 52. The network signaling protocol 60 alerts the called party's SSP 50 that calling party 32 is attempting to terminate a call to the called party 52.

In the AIN of the present embodiment, central databases 23, 43 at SCPs 22, 42 store information identifying the types of terminating services available to each subscriber 34, 54. This information determines how SCPs 23, 43 will handle queries sent from the called party's SSP 50.

When the called party's SSP 50 attempts to terminate the call, SSP 50 triggers a query to its SCP 42 via STP 44. In particular, SSP 50 sends the triggered query over the signaling network via STP 44 to SCP 42 as it would send a network signaling protocol 60. The triggered query preferably contains the 10 digit telephone number of calling party 32. Preferably, SSP 50 has software with an associated computer processor and memory which recognizes the network signaling protocol identifying an incoming call attempt. In response, SSP 50 software formulates the trigger query and transmits it to STP 44 as it would a network signal protocol message.

The triggered query requests SCP database 43 to identify the terminating services available to the called party 52. For example, SCP database 43 may contain information identifying the terminating services available for each telephone number in the form of a database or lookup table in a memory storage device such as random access memory, or a magnetic or optical disk drive, known to those skilled in the art. Of course, a combination of different memory storage devices or other types of devices may he used. The memory storage device preferably stores the service information in a data record such as an array, lookup or pointer table or other data structure known to those skilled in the art. Upon receiving the triggered query, SCP 42 preferably indexes the called party's number into SCP database 43 to obtain the information regarding the services available to the called party 52. If caller identification is available in the SCP database 43, SCP 42 will attempt to determine the name of the calling party 32. In the preferred embodiment, the trigger query contains the calling party's 10 digit telephone number.

Figure 2:
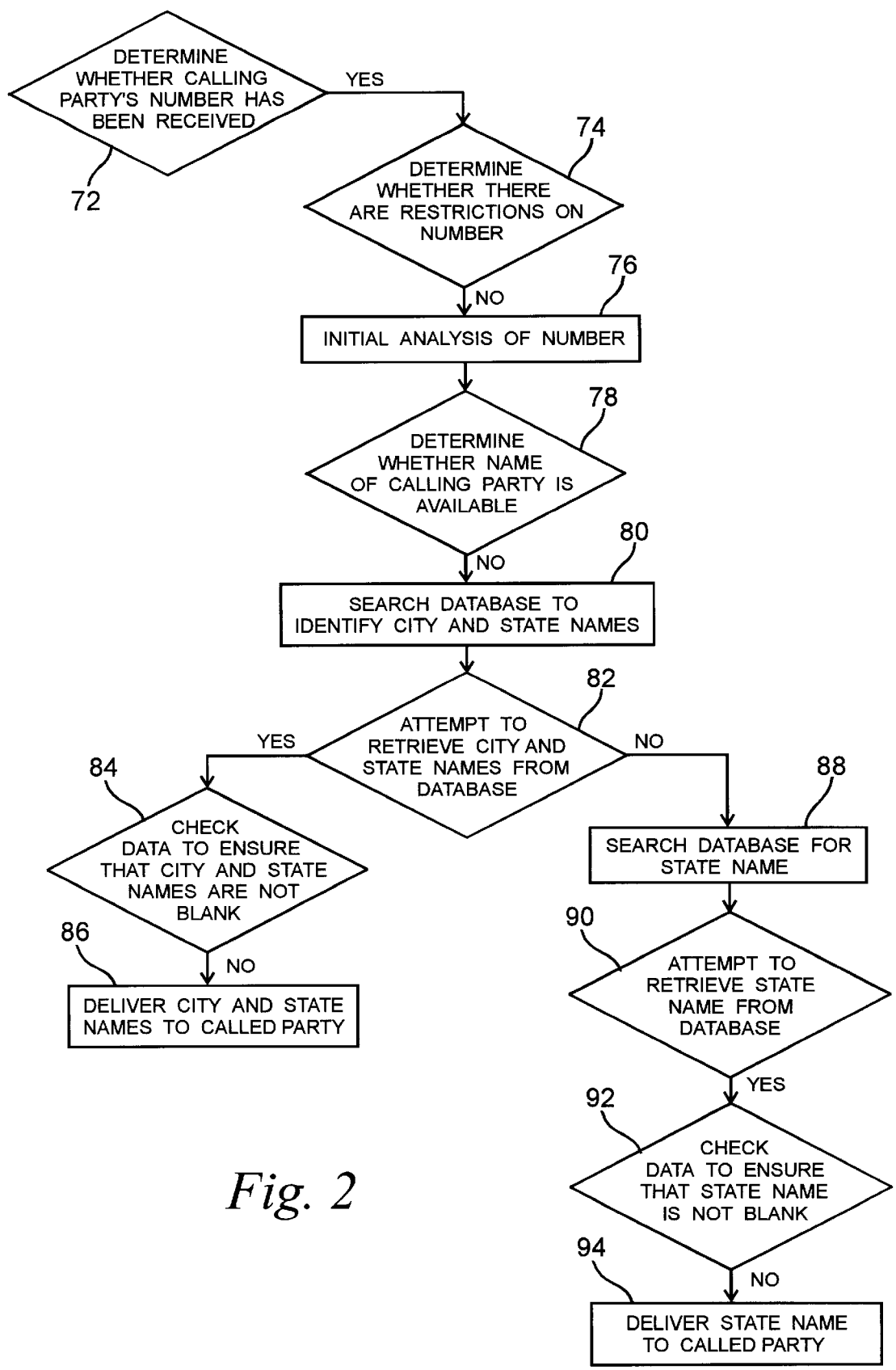
FIG. 2 is a flow chart of the method of the present invention utilized in the telephone network of FIG. 1.

Referring now to FIG. 2, SCP 42 (FIG. 1) determines 72 whether the calling party's telephone number has been received. If the telephone number has been received, SCP 42 determines 74 whether the calling party 32 has placed any restrictions on the disclosure of his name by requesting that it not be disclosed. If there are no restrictions, SCP 42 performs 76 an initial analysis of the calling party's ten digit telephone number. Preferably, SCP 42 analyzes the first six digits of the telephone number to determine whether the calling party name is within SCP database 43. The first six digits of a ten digit telephone number are typically referred to as a NPANXX combination. For example, a NPANXX contains an area code and prefix such as 312–321. Alternatively, SCP 42 may analyze the first three digits of the calling party telephone to determine whether a calling party 32 is within database 43.

Preferably, SCP 42 analyzes the NPANXX by searching database 43 containing all of the combinations of the NPANXX of all the phone numbers available within the database. If the NPANXX of the calling party's telephone number is found within the database, then the calling party name is available and can be determined by matching the last 4 digits of the calling party number.

However, if the combination of the first six digits of the calling party's telephone number is identified 78 as not being listed within the database, then the name of the calling party is not available. For example, if the name of the calling party cannot be determined, the calling party 32 and called party 52 are typically from different calling regions serviced by different SCPs which do not share name and telephone number information. Rather than providing no information regarding the calling party, the present invention attempts to provide alternate types of information about the calling party.

One alternate type of calling party information which may be provided in lieu of the calling party name is the name of geographical area from which the calling party originated the call. For example, the name of the state (e.g., Alaska, Alabama, Arkansas, etc.) or the city (e.g, Chicago, Atlanta, New York, etc.) in which the calling party originated the call may be provided in place of the caller name.

To identify the names of the city and state, the called party's SCP 42 sends a query to database 43 requesting the names of the city and state that is associated with the NPANXX of the calling party's telephone number. SCP 42 searches 80 database 43 to find the combination of the first six digits of the calling party's telephone number and the city and state names associated with the combination. If the combination of the first six digits is found, then the corresponding city and state names are retrieved 82 by SCP 42. SCP 42 checks 84 to ensure that both the city and state names were returned by analyzing the returned names to see if they are blank. If city and state names are not blank they are delivered 86 to the called party 52.

However, if the combination of the first six digits of the calling party's telephone number is not found within the database, SCP 42 searches 88 for the first three digits of the number. These digits are commonly referred to as the area code and are designated by NPA. If the combination of three digits is found then the corresponding state name is retrieved 90 by SCP 42. SCP 42 checks 92 to ensure that a state name was returned by determining whether the returned state name is blank. If the returned state name is not blank then it is delivered 94 to the called party 52.

The present embodiment may be implemented with software and logic as known to those of skill in the art. For example, the present embodiment may be written in a high level programming language such as Pascal, C or C++. The present embodiment may be written and compiled to run on a standard UNIX operating system microcomputer implemented within the SCP.

Figure 3:
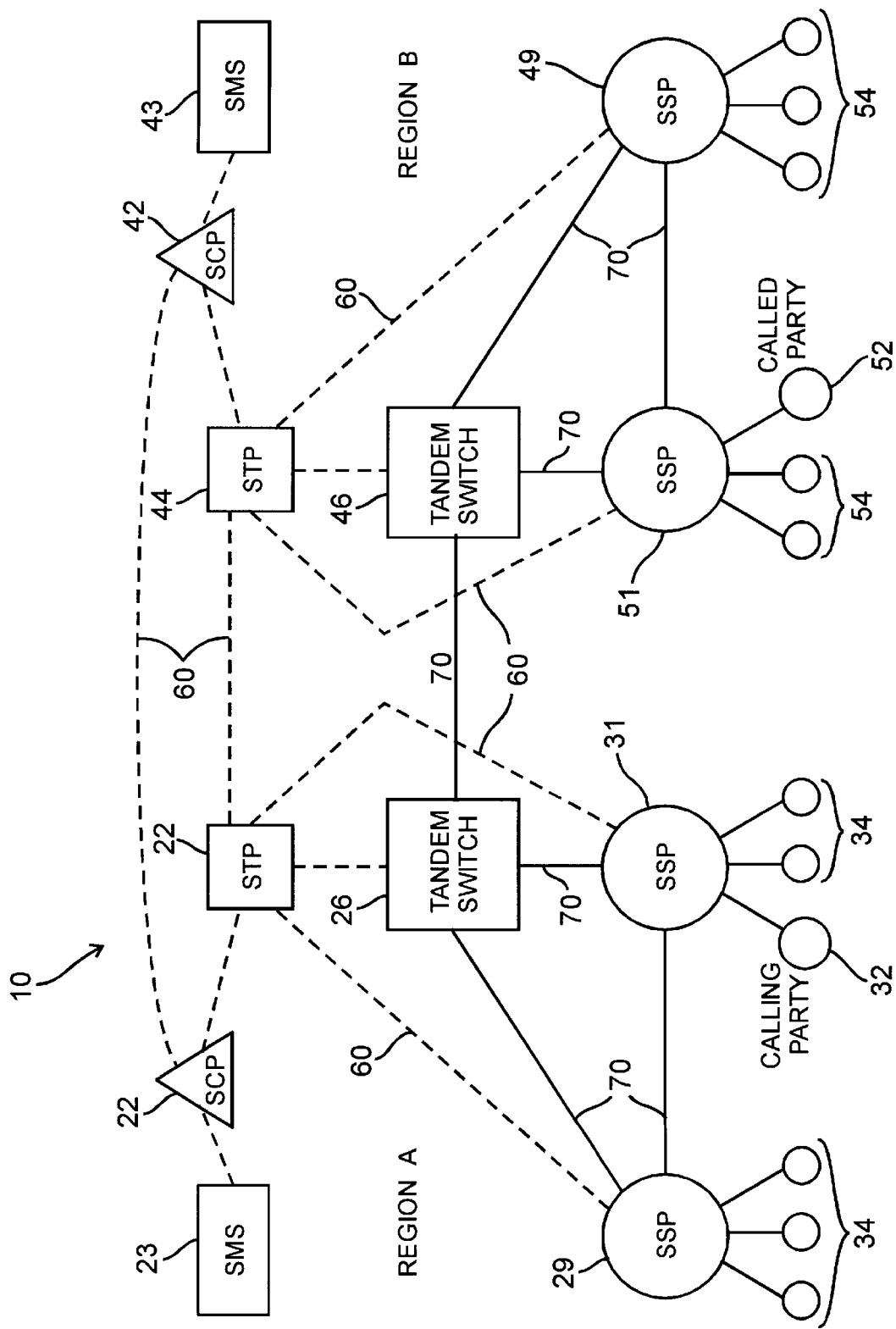
FIG. 3 is a block diagram of a telephone network system.

Referring to FIG. 3, in an alternate embodiment, end offices 29, 31, 49, 51 equipped with standard switching equipment provide subscribers with access to the telephone network 10. End offices 29, 31, 49, 51 provide for the transmission and receipt of voice and data communication 70 between tandem switches 26, 46 and other end offices. End offices 29, 31, 49, 51 also provide for network signaling communication 60 with STPs 24, 44.

In this embodiment, the process of identifying the name of a calling party in the alternate preferred embodiment begins when the calling party 32 lifts a receiver and sends the number of the called party 52 to the end office 29, 31, 49, 51. The calling party's end office 31 sends a network signaling protocol 60 to the STP 24 which routes the network signaling protocol signal 60 to the called party's end office 51. The network signaling protocol 60 alerts the called party's end office 51 that calling party 32 is attempting to terminate a call to called party 52 of end office 51.

When the called party's end office 51 attempts to terminate the call, end office 51 sends a specific query to its SCP 42 via STP 44. In comparison to an AIN triggered query, the specific query request instructs the SCP 42 to perform specific tasks. The specific query request preferably contains the 10 digit telephone number of calling party 32. End office 51 sends the specific query over the signaling network via STP 44 to SCP 42 as it would send a network signaling protocol 60. Preferably, end offices 29, 31, 49, 51 have software with an associated computer processor and memory which recognizes the network signaling protocol identifying an incoming call attempt.

The specific query requests a SCP database 43 to respond with the calling party's name. For example, SCP database 43 may contain information identifying the names available for each telephone number in the form of a database or lookup table in a memory storage device such as random access memory, or a magnetic or optical disk drive, known to those skilled in the art. Of course, a combination of different memory storage devices or other types of devices may be used. The memory storage device preferably stores the service information in a data record such as an array, lookup or pointer table or other data structure known to those skilled in the art.

Upon receiving the query, SCP 42 preferably indexes the calling party's telephone number into SCP database 43 to obtain the information regarding the names available to the called party 52. If caller identification is assigned to the customer as translated in end office 51, SCP 42 will attempt to determine the name of the calling party 32. In the preferred embodiment, the query contains the calling party's 10 digit telephone number.

Figure 4:
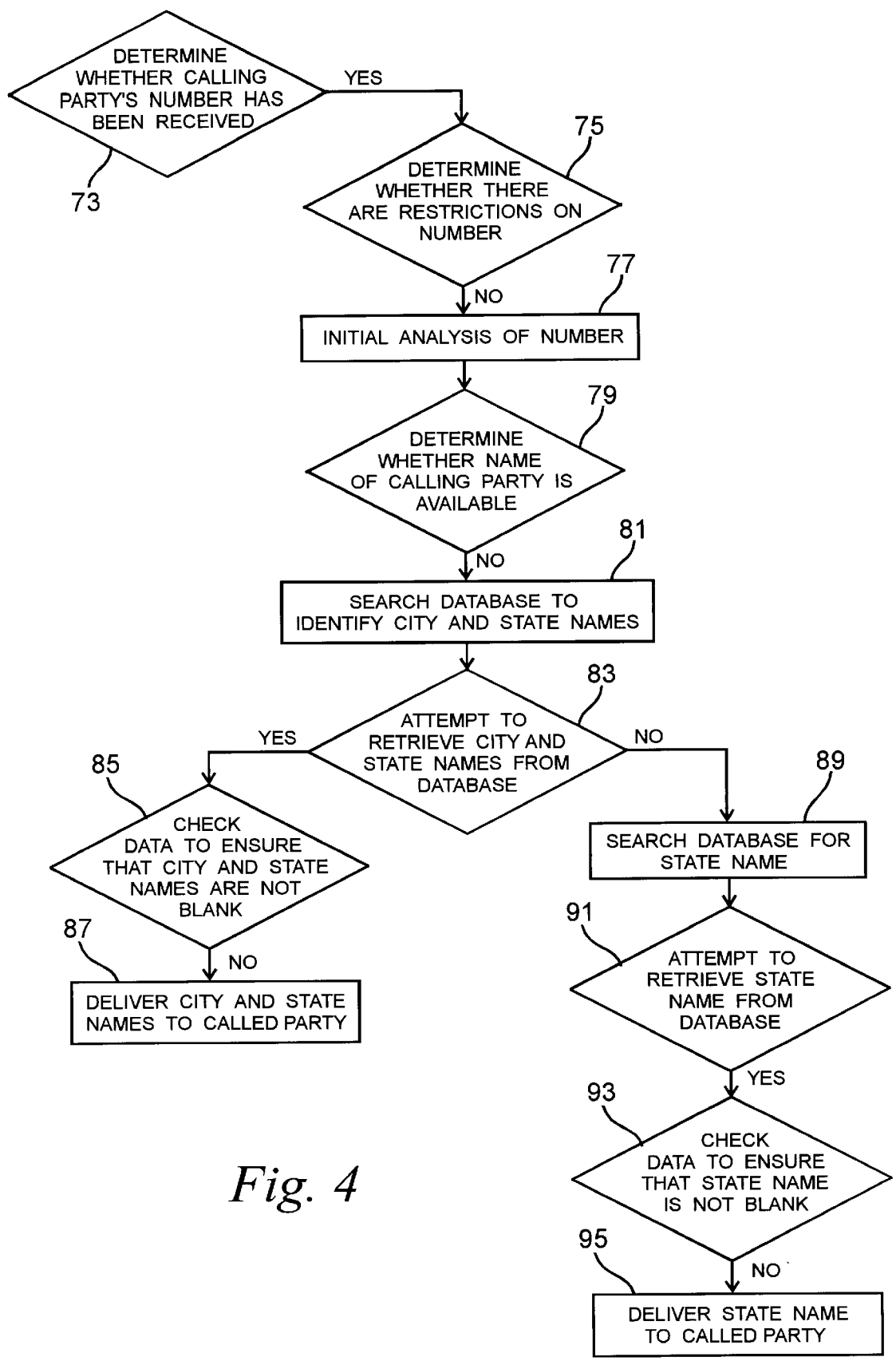
FIG. 4 is a flow chart of the method of the present invention utilized in the telephone network of FIG. 3.

Referring now to FIGS. 3 and 4, end office 51 determines 73 whether the calling party's telephone number has been received. If the number has been received, end office 51 determines 75 whether the calling party 32 has placed restrictions on the disclosure of his name by requesting that it not be disclosed. If there are no restrictions STP 44 may perform 77 an initial analysis of the calling party's ten digit telephone number. The first six digits of a ten digit telephone number are typically referred to as a NPANXX combination. For example, a NPANXX contains an area code and prefix such as 312–321. Alternatively, SCP 42 may analyze the first three digits of the calling party number to determine whether a calling party is within the database 43.

Preferably, SCP 42 analyzes the NPANXX by indexing the database 43 containing all of the combinations of the NPANXX of all the telephone numbers available within the database. If NPANXX of the calling party's telephone number is found within the database, then the calling party name is available.

However, if the combination of the first six digits of the calling party's telephone number is identified 79 as not being listed within database 43 the calling party name is not available. For example, if the name of the calling party cannot be determined, the calling and called party are typically from different calling regions serviced by different SCPs which do not share name and number information. Rather than providing no information regarding the calling party, the present invention attempts to provide alternate types of information about the calling party.

One alternate type of calling party information which may be provided in lieu of the calling party name is the name of geographical areas from which the calling party originated the call. For example, the name of the state (e.g., Alaska, Alabama, Arkansas, etc.) or the city in which the calling party originated the call may be provided in place of the caller name.

To identify the names of the city and state, the called party STP 44 sends a query to database 43 requesting the names of the city and state that are associated with the NPANXX of the calling party's telephone number. SCP 42 performs 81 a database index to find the combination of the first six digits of the calling party's telephone number and the city and state names associated with such combination. If the combination of the first six digits is found, then corresponding city and state names are retrieved 83 by SCP 42. SCP 42 checks to ensure that both the city and state names were returned by analyzing 85 the returned names to see if they are blank. If city and state names are not blank, they are delivered 87 to the called party 52.

However, if the combination of the first six digits of the calling party's telephone number is not found within database 43, SC 42 indexes 89 for the first three digits of the number. These digits are commonly referred to as the area code and are designated by NPA. If the combination of three digits is found, then the corresponding state name is retrieved 91 by SCP 42. SCP 42 checks 93 to ensure that a state name was returned by determining whether the returned state name is blank. If the returned state name is not blank, then it is delivered 95 to the called party 52.

The present embodiment may be implemented with software and logic as known to those of skill in the art. For example, the present embodiment may be written in a high level programming language such as Pascal, C or C++. The present embodiment may be written and compiled to run on a standard UNIX operating system microcomputer implemented within the SCP.

It is to be understood that foregoing detailed description is exemplary and explanatory and is intended to provide further explanation of the invention as claimed. Numerous modifications and variations are possible. The invention, together with the further objects and intended advantages, will best be understood by reference to the following detailed description, taken in conjunction with the accompanying drawings.

We claim:

1. A method of determining a state name from which a telephone call originates comprising the steps of:

receiving a query from a central office of a called party; and searching a database to analyze the query by determining whether a calling party name is available in the database;

identifying the state name of the calling party when the calling party name is not available in the database; and automatically delivering the state name of the calling party to the called party.

2. The invention of claim 1 wherein the query includes a calling party's ten digit telephone number.

3. The invention of claim 1 wherein the database is searched to determine whether the combination of the first three digits of a calling party's ten digit telephone number and associated name are contained within the database.

4. The invention of claim 1 wherein the database is searched to identify the state name by searching for the combination of the first three digits of the calling party's ten digit telephone number.

5. A method of determining a city name and a state name from which a telephone call originates comprising the step of:

receiving a query from a central office of a called party;

searching a database to analyze the query by determining whether a calling party name is available in the databases;

identifying the city name and state name of the calling party when the calling party name is not available in the database; and automatically delivering the city name and the state name of the calling party to the called party.

6. The invention of claim 5 wherein the query includes a calling party's ten digit telephone number.

7. The invention of claim 5 wherein the database is searched to determine whether the combination of the first three digits of a calling party's ten digit telephone number and associated name is contained within the database.

8. The invention of claim 5 wherein the database is searched to identify the city and state names by searching for the combination of the first six digits of the calling party's ten digit telephone number.

9. A method for determining a state name from which a telephone call originates comprising the steps of:

receiving a triggered query from a service switching point of a called party;

searching a database to analyze the triggered query by determining whether a calling party name is available in the database;

identifying the state name of the calling party when the calling party name is not available in the database; and automatically delivering the state name of the calling party to the called party.

10. The invention of claim 9 wherein the triggered query includes a calling party's ten digit telephone number.

11. The invention of claim 9 wherein the database is searched to determine whether the combination of the first three digits of a calling party's ten digit telephone number and associated name are contained within the database.

12. The invention of claim 11 wherein the database is searched to identify the state name by searching for the combination of the first three digits of the calling party's ten digit telephone number.

13. A method of determining a city name and a state name from which a telephone call originates comprising the steps of:

receiving a triggered query from a service switching point of a called party;

searching a database to analyze the triggered query by determining whether a called party name is available in the database;

identifying the city name and state name of the calling party when the calling party name is not available in the database; and automatically delivering the city name and the state name of the calling party to the called party.

14. The invention of claim 13 wherein the triggered query includes a calling party's ten digit telephone number.

15. The invention of claim 14 wherein the database is searched to determine whether the combination of the first three digits of a calling party's ten digit telephone number and the associated name is contained within the database.

16. The invention of claim 15 wherein the database is searched to identify the city and state names by searching for the combination of the first six digits of the calling party's ten digit telephone number.

\* \* \* \* \*

UNITED STATES PATENT AND TRADEMARK OFFICE
CERTIFICATE OF CORRECTION

PATENT NO. : 5,982,867
DATED : November 9, 1999
INVENTOR(S) : Ron Urban et al.

It is certified that error appears in the above-identified patent and that said Letters Patent is hereby corrected as shown below:

In claim 1, lines 3-4, delete "party; and" and substitute --party;-- in its place.

In claim 5, lines 6-7, delete "databases;" and substitute --database;-- in its place.

Signed and Sealed this

First Day of May, 2001

Attest:

NICHOLAS P. GODICI

Attesting Officer

Acting Director of the United States Patent and Trademark Office